United States Patent [19]

Drexl et al.

[11] Patent Number: 4,813,295

[45] Date of Patent: Mar. 21, 1989

[54] FLY-WHEEL UNIT WITH DISENGAGEABLE FRICTION DEVICE

[75] Inventors: Hans-Jürgen Drexl, Schonungen-Mainberg; Bernhard Schierling, Kürnach; Franz Hartig, Dittelbrunn; Manfred Caspar, Oberwerrn, all of Fed. Rep. of Germany

[73] Assignee: Fichtel & Sachs AG, Schweinfurt, Fed. Rep. of Germany

[21] Appl. No.: 185,326

[22] Filed: Apr. 19, 1988

Related U.S. Application Data

[63] Continuation-in-part of Ser. No. 829,784, Feb. 14, 1986, abandoned.

[30] Foreign Application Priority Data

Feb. 19, 1985 [DE] Fed. Rep. of Germany ....... 3505677

[51] Int. Cl.$^4$ .................. G05G 1/00; F16F 15/10; F16D 3/14; F16D 47/02
[52] U.S. Cl. ......................... 74/572; $\theta$/574; 192/106.2; 192/48.5; 192/30 V; 464/66; 464/68
[58] Field of Search ................. 74/572, 574; 464/66–68, 24, 27; 192/106.1, 106.2, 30 V, 70.17, 55, 48.5

[56] References Cited

U.S. PATENT DOCUMENTS

| 1,918,249 | 7/1933 | Dashefsky | 74/574 |
|---|---|---|---|
| 4,468,207 | 8/1984 | Yoshida | 74/574 |
| 4,493,673 | 1/1985 | Anders et al. | 464/66 |
| 4,563,165 | 1/1986 | Takeuchi | 464/68 |
| 4,586,595 | 5/1986 | Hartig et al. | 192/106.2 |
| 4,596,535 | 6/1986 | Ooga | 464/68 |
| 4,624,351 | 11/1986 | Lutz et al. | 192/48.5 |
| 4,638,684 | 1/1987 | Maucher | 74/574 |

FOREIGN PATENT DOCUMENTS

| 2931423 | 2/1980 | Fed. Rep. of Germany | 74/572 |
|---|---|---|---|
| 84121165 | 7/1984 | Fed. Rep. of Germany | 74/572 |
| 2148455 | 5/1985 | United Kingdom | 74/572 |

Primary Examiner—Richard E. Moore
Assistant Examiner—Vinh Luong
Attorney, Agent, or Firm—Toren, McGeady & Associates

[57] ABSTRACT

A fly-wheel includes a first part and a second part. Both parts are rotatably mounted with respect to the other. Torsional springs are provided in torque-transmitting engagement between the two parts of the fly-wheel. Further, a friction device is provided between the two parts. This friction device is controlled by fly weights and a biasing spring such that below the idling rpm of an internal combustion engine driving the fly-wheel the friction device maintains an increased frictional torque-transmission between the two part.

14 Claims, 4 Drawing Sheets

FLY-WHEEL UNIT WITH DISENGAGEABLE FRICTION DEVICE

This is a continuation-in-part of application Ser. No. 06/829,784, filed Feb. 14, 1986, now abandoned.

BACKGROUND OF THE INVENTION

This invention relates to a fly-wheel unit, consisting inter alia of a first fly-wheel connected with the crank-shaft of an internal combustion engine, a second fly-wheel which is mounted on the first one and arranged to be rotatably to a limited degree in relation thereto and a torsion damper device between the two fly-wheels including at least of torsion springs and possibly a friction device.

STATEMENT OF THE PRIOR ART

A fly-wheel unit of the above-stated kind is known for example from Fed. German Pat. Sp. No. 2,931,423. Such divided fly-wheels are usually so attuned in their vibration behaviour that their natural frequency lies very low, for example below the idling rotation rate of the internal combustion engine. Now these rotation rate ranges are run through regularly at least during the starting action and during the shutting-off phase of the internal combustion engine. Then undesired knocking noises occur. Therefore in the specification cited as prior art a slipping clutch is installed between the two fly-wheels. This slipping clutch must on the one hand transmit the engine moment or engine torque with sufficient reliability, but on the other hand should slip in the case of the high degrees of irregularity. With such a constuction the danger exists that for example if the friction linings are oiled, the friction device can no longer reliably transmit the engine moment.

OBJECT OF THE INVENTION

It is the object of the present invention to achieve a damping in the range of the natural frequency which is not detrimental to the force transmission volume of the clutch. This damping, as far as possible should be applicable in directed manner in the range intended for it.

SUMMARY OF THE INVENTION

In view of this object the present invention provides a fly-wheel unit comprising a first fly-wheel and a second fly-wheel. The first fly-wheel is connected for common rotation with the crank-shaft of an internal combustion engine. The second fly-wheel is rotatably mounted with respect to the first fly-wheel for limited angular movement with respect thereto. A torsion damper device is arranged between the two fly-wheels and comprises at least one group of torsion springs and possibly—but not necessarily—a friction device. At least part of the torsional damper device can be by-passed by a further centrifugal force-controlled friction device, which further friction device becomes effective in the range of rotation rate below the idling rotation rate and generates a high friction force. By the centrifugal-force-dependent engagement of a high friction moment below the idling rotation rate it is ensured that the rotational vibrations are effectively suppressed in this range. The transmission capacity of the divided fly-wheel is unaffected thereby. Thus noises from torsional vibrations during starting and shutting off of the internal combustion engine are effectively diminished.

The Sub-claims lay down advantageous further developments of the invention. Thus the possibility exists that a friction device is merely engaged and disengaged by means of centrifugal weights. Thus from the moment of engagement the intended friction moment or friction torque is fully effective. On the other hand there are also solutions in which the friction is eliminated by means of centrifugal weights according to the increase of centrifugal force. By appropriate formation of the centrifugal weights and the engagement elements it is possible to influence the engagement curve so that the friction is built up fully within a quite narrow rotation rate range.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will next be explained in greater detail by reference to several examples of embodiment. Individually.

DESCRIPTION OF THE PREFERRED EMBODIMENTS

Figure 1:
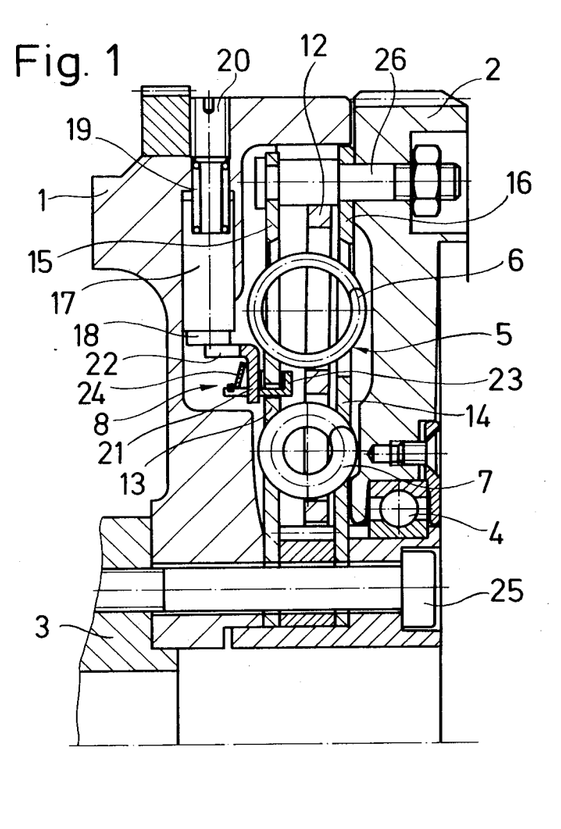
FIGS. 1 and 2 show the partial longitudinal section through a fly-wheel unit with the partial view of the arrangement of the centrifugal weights and engagement elements.

FIG. 1 shows the partial longitudinal section through a fly-wheel unit. The first fly-wheel 1 is connected fast through securing screws 25 with the crank-shaft 3 of an internal combustion engine shown schematically in FIG. 3 by a labeled box. The second fly-wheel 2 is mounted rotatably by a predetermined a limited amount in relation to the first fly-wheel 1 and the crank-shaft 3, by means of a bearing 4. The fly-wheel 2 may be provided with a clutch housing (not shown) of a well-known clutch which transmits the torque of the engine to a gear box and may be disengaged in view of changing the gear ratio. A friction face for this clutch may be provided on the second fly-wheel 2. Between the two fly-wheels 1 and 2 there is provided a torque transmission means 5 which in the present case consists of the following parts: A set of torsion springs 7 is loaded through cover plates 13 and 14, provided with appropriate windows, by the engine torque. The cover plates 13, 14 are mounted on the fly-wheel 1 for common and define a first torque transmission unit. The transmission of the torque takes place through a hub disc or central disc 12 in which the torsion springs 7 engage. The hub disc 12 which is capable of limited angular movement with respect to the first fly-wheel 1 transmits the torque to a second set of torsion springs 6 which engage the cover plates 15 and 16 which are firmly connected with the second fly-wheel 2, namely through securing bolts 26 and define a second torque transmission unit. A friction device can be provided between the two parts of the torsion damper device 5. A friction device 8 is provided on the internal circumference of the cover plate 15 facing the first fly-wheel 1. This friction device consists of an angle ring 21, the annular basic body of which extends parallel with the cover plate 15, and which comprises on its external circumference on axially protruding collar with openings 22. A counter-ring 23, which engages behind the inner edge of the cover plate 15, is connected fast in rotation but axially displaceably with the angle ring 21. The counter-ring 23 reaches with axial prolongations through corresponding openings of the basic body of the angle ring 21 and is stressed in relation to the latter by a dished spring 24 in such a way that a friction force is generated between the cover plate 15 and the two rings 21 and 23. Friction rings of friction material are preferably arranged between the corresponding friction faces. The openings 22 in the angle ring 21 serve for the engagement of centrifugal weights 17 which are held radially displaceably in corresponding radially extending guides in the first fly-wheel 1. Each of these centrifugal weights 17 is springs-loaded radially inwards by a spring 19. The biasing force of these springs 19 can be adjusted exactly by a set screw 20. The centrifugal weights 17 each have a head 18, at their end regions facing the openings 22 of the angle ring 21, which can be introduced without play in the circumferential direction into the openings 22. As may be seen especially from FIG. 2, the spacing of the centrifugal weights 17 arranged over the circumference is made unequal to the spacing of the openings 22 in the angle ring 21. Thus it is ensured that in every operational condition, that is at every position between the first fly-wheel 1 and the angle ring 21, engagement of the heads 18 of the centrifugal weights 17 in one of the openings 22 is possible.

Figure 2:
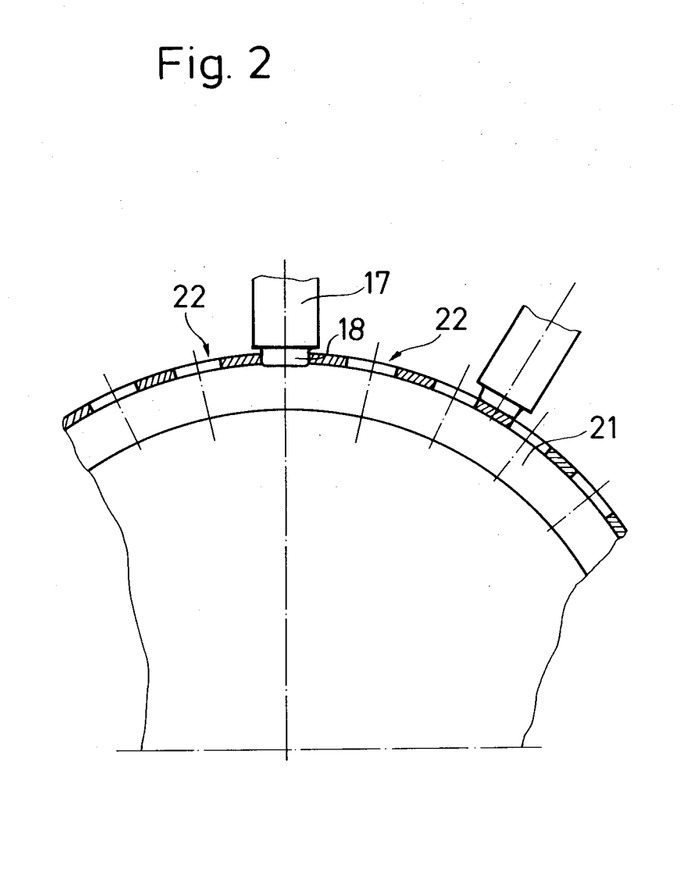

The function of the friction insert is as follows:

At rotation rates below the idling rate the centrifugal weights 17 are moved radially inwards by the force of the springs 19 and engage with their heads 18 in the openings 22 of the angle ring 21. Thus the friction device 8 is held fast in relation to the first fly-wheel 1. All torsional vibrations now have to take place by overcoming the friction force of the friction device 8. The friction force of this friction device 8 is made high, so that the large angular deflections in this range are diminished so far that neither disturbing noises or damage to individual parts takes place. The friction device 8 by-passes at low rotation rate both the torsion springs 7 and 6.

Figure 3:
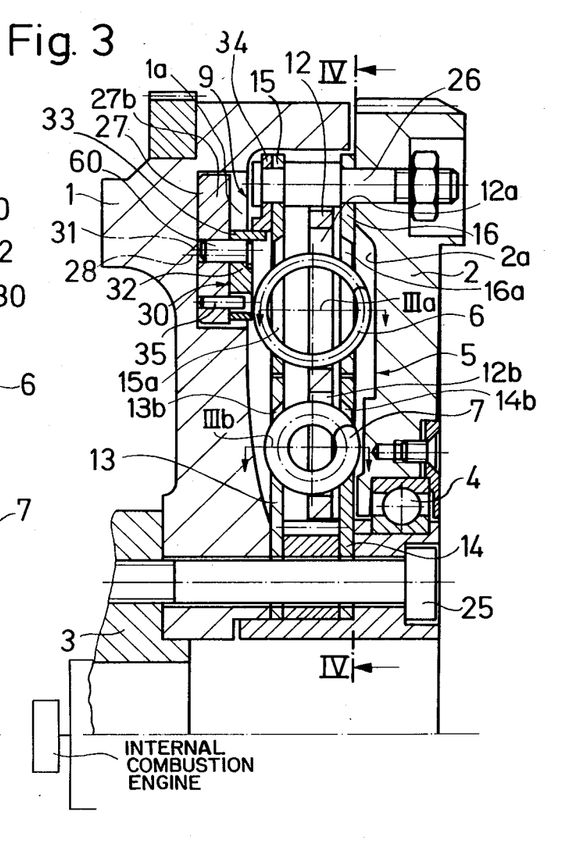
FIGS. 3 and 4 show a longitudinal and a partial section through a fly-wheel unit with friction elements arranged on centrifugal weights.
Figure 4:
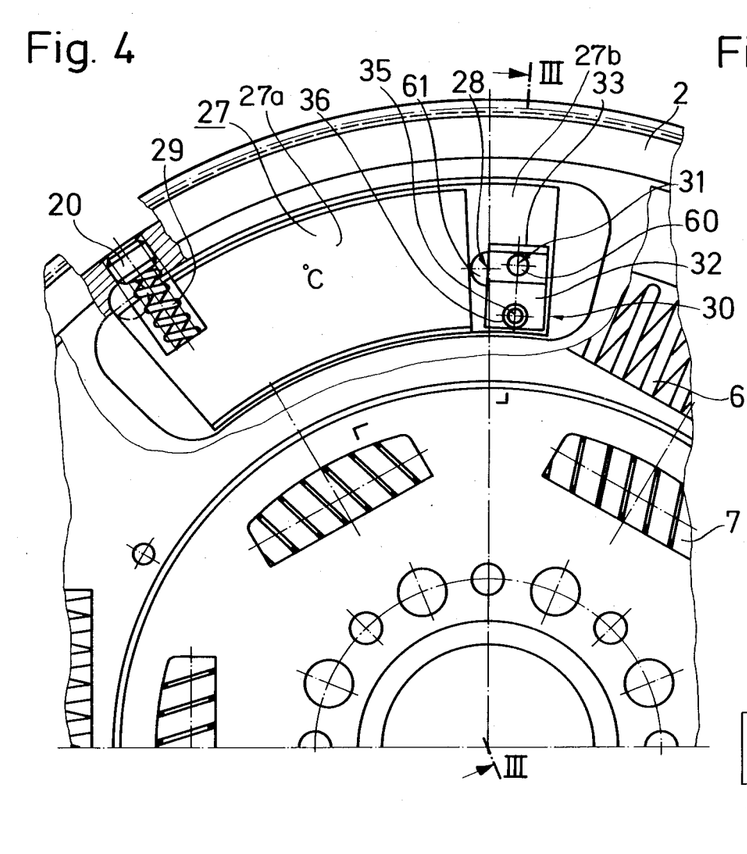

FIGS. 3 and 4 show a further similar example of embodiment. FIG. 3 shows the longitudinal section III—III through a divided fly-wheel and FIG. 4 the section IV—IV, the region around the centrifugal weight being cut away.

Also in FIGS. 3 and 4 the cover plates 13, 14 are fixed for common rotation with the fly-wheel 1 by bolts 25. The fly-wheel 1 is fixed to a crankshaft 3. The fly-wheel 2 is rotatably mounted with respect to the fly-wheel 1. A usual motor vehicle clutch may be fastened to the fly-wheel 2. Cover plates 15 and 16 are fastened to the fly-wheel 2 by bolts 26. A hub disc or central disc 12 is located axially between the cover plates 13, 14 defining a first torque transmission unit and the cover plates 15, 16 defining a second torque transmission unit. Torsion springs 6 are located in axially aligned windows 15a, 16a and 12a of the cover plates 15, 16 and the central disc 12, respectively. Further torsion springs 7 are located in axially aligned windows 13b, 14b of the cover plates 13, 14 and the central disc 12, respectively.

The torsional springs 7 transfer torque from the cover plates 13, 14 to the central disc 12. The torsional springs 6 transfer torque from the central plate 12 to the cover plates 15, 16. This is illustrated in FIGS. 3a, 3b and 3aa, 3bb which are sectional illustrations according to line IIIa and IIIb.

Figure 3A:
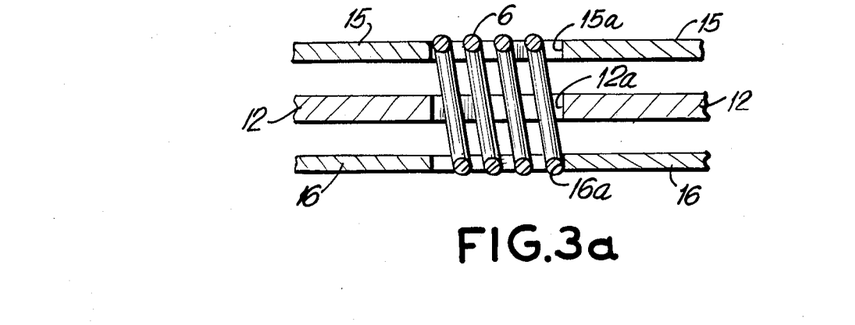
Figure 3B:
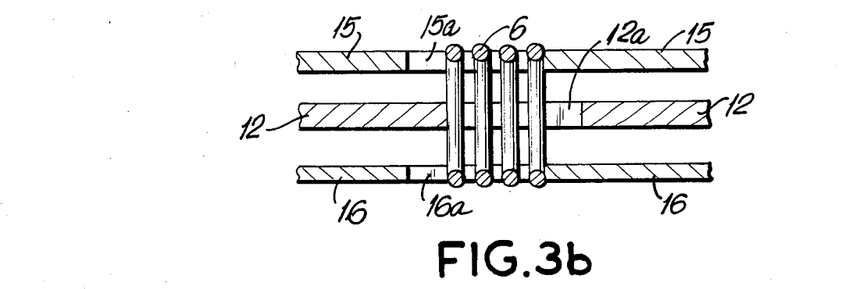

FIGS. 3a and 3b show the torsional springs 6 and 7, respectively, in the unloaded condition.

FIGS. 3aa and 3bb show the torsional springs 6 and 7, respectively, in the torque-transmitting condition.

The formation of the friction device 9 is different from FIG. 1. To the friction device 9 there pertain centrifugal masses 27 which are mounted in the first fly-wheel pivotably about a pivot axis 28 parallel to the axis of the crankshaft. The pivot axis 28 is formed by the pivot journal 61 visible in FIG. 4. Each centrifugal mass 27 comprises a first portion 27a and a second portion 27b with the center of mass of the centrifugal mass 27 being located within the first portion 27a. The centrifugal masses 27 are radially inwardly loaded, on the side of the first portion by a compression spring 29, which is adjustable with a set-screw 20 and acts as a centrifugal mass biasing means. The second portion of the centrifugal mass 27 serves in the present case for the generation of frictional engagement. For this purpose in this second portion of the centrifugal weight 27 there is arranged an angle-shaped friction piece 30 which rests with its first leg 32 on the centrifugal mass 27 and with a radially outwardly arranged second leg 33 faces in the axial direction towards the cover plate 15. This friction piece 30 is arranged, by means of a journal 60, for rotating by a limited angle of rotation about a rotation axis 31—for self-adjustment during the friction application. For this purpose in the first leg 32, an opening 36 is provided which is larger than a pin 35 which is anchored fast in the centrifugal mass and reaches into the opening 36 such as to define abutment means 35, 36. The second leg 33 of the friction piece 30 acts in relation to a counter-piece 34 as friction device, the counter-piece 34 being fixedly arranged on the cover plate 15, namely through a securing bolt 26 in each case. The center piece of fly-wheel side function member is located between the centrifugal weight 27 and the opposite face 2a of the second fly-wheel 2. The counter-piece 34 can likewise comprise a leg facing in the direction towards the centifugal weight, to increase the friction area.

The function of the friction device 9 is as follows:

At rotation rates below the idling rate the force of the compression spring 29 effects a pivoting of the centrifugal first arm 27a of the mass 27 in the counter-clockwise direction about the pivot axis 28, so that the friction angle 30 is subejcted to a radially outward directed movement. Thus it comes with its second leg 33 into frictional engagement with the counter-piece 34 which is situated on the second fly-wheel 2. For damping the torsional vibration occurring between the first and second fly-wheels 1 and 2 friction torque is generated between the friction piece 30 and the counter-piece 34, and increases with decreasing rotation rate. At and above the idling rotation arate the centrifugal force acting upon the centrifugal mass 27 effects a pivoting of these centrifugal mass 27 about the pivot axis 28 in the clockwise direction against the force of the compression spring 29 and a lifting of the friction piece 30 away from the counter-piece 34. The friction device 9 bridges on low rotation rate both the torsion springs 7 and 6.

The torsion spring 6 is located in axially aligned windows 12a, 15a, 16a in the central or hub disc 12 and in the cover plates 15, 16. The other torsion spring 7 is located in axially aligned windows 12b, 13b, 14b in the hub or central disc 12 and in the additional side plates 13, 14. The side plates 13, 14 are located radially inwardly of the side plates 15, 16.

Figure 5:
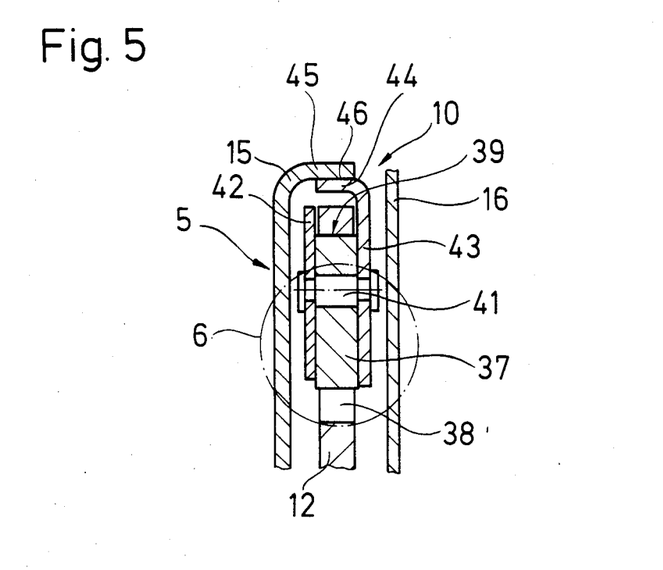
FIGS. 5 and 6 show a partial longitudinal section and a partial elevation of centrifugal weights arranged by means of knife-edge bearings.
Figure 6:
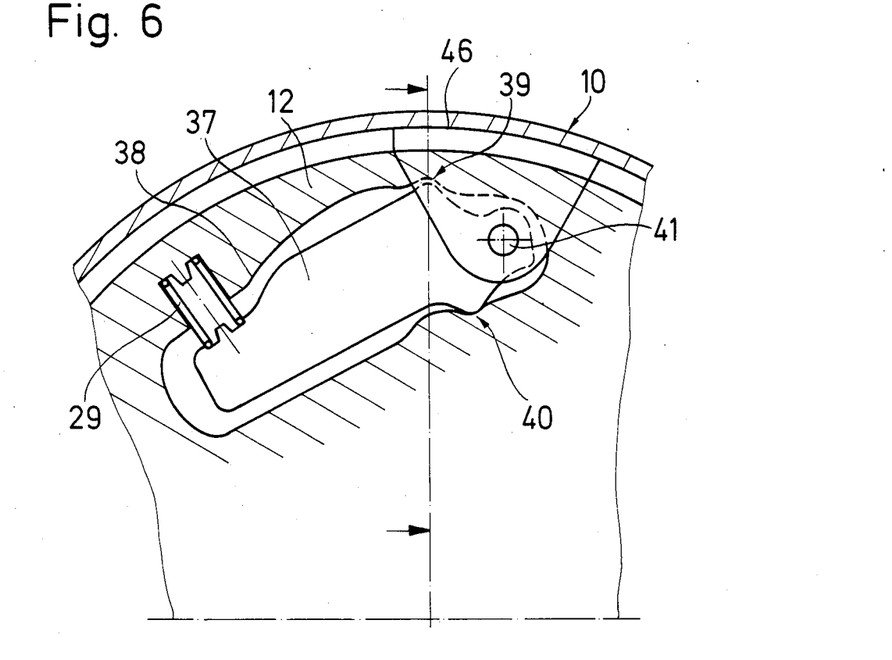

FIGS. 5 and 6 show a partial longitudinal section and a partial elevation of a centrifugal force arrangement which corresponds in rough outlines to the arrangement according to FIGS. 3 and 4. However the arrangement takes place within the torsion damper device 5 between the hub disc 12 and the cover plates 15 and 16. In the present case the centrifugal weights 37 are arranged in corresponding openings 38 of the hub disc 12 which is capable of limited angular movement with respect to the fly-wheels 1 and 2. In contrast to the embodiment according to FIGS. 3 and 4, the fly weights 37 are not mounted about fixed pivot spindles, but comprise knife-bearing 40 which is effective radially inwards and comes into action on falling short of the idling rotation rate. In the circumferential end region of the centrifugal weight 37, remote from the two knife-edge bearings 39 and 40, the weight is loaded radially inwards by a compression spring 29. In the circumferentially opposite region of the centrifugal weight 37, still on the far side of the two knife-edge bearings 39 and 40, a bolt 41 is arranged which penetrates the centrifugal weight 37, connects guide plates 42 and 43, arranged to both sides of the centrifugal weight 37, with one another and renders possible a rotating movement in relation to the centrifugal weight 37. At least one of the two guide plates 43 is provided with an axially pointing tab 44 which constitutes the one part of the friction device. The other part of the friction device is formed by a likewise axially pointing tab 45 of the cover plate 15.

Now the manner of operation of the present friction device 10 is as follows: On loading of the torsion damper device 5 with irregular torque a relative movement occurs between the hub disc 12 with the centrifugal weights 37 and the guide plates 42 and 43 for the one part and the two cover plates 15 and 16 for the other part, the two systems being bound into the torque transmission by means of the torsion springs 6. At a rotation rate above the idling rate the centrifugal weights 37 are shifted radially outwards against the force of the compression springs 29 and at the same time bear on the knife-edge bearing 39. Due to the supporting on the knife-edge bearing 39, when the centrifugal weight 37 is moved outwards, in total a pivoting movement in the clockwise direction results so that the region of the centrifugal weight 37 with the bolt 41 and the two guide plates 42 and 43 carries out a movement radially inwards and thus there is a gap between the two tabs 44 and 45. In this operational condition a friction force is not generated. When the rotation rate drops below the idling rate the centrifugal weight 37 is pivoted in the counter-clockwise direction by the force of the compression spring 29 and the region of the centrifugal weight 37 on the side of the knife-edge bearing 39 remote from the compression spring 29 pivots radially outwards. Thus the two tabs 44 and 45 come into the frictional egnagement and form the friction face 46. Due to the abutment of the two tabs 44 and 45 these form a radially fixed stop on the friction face 46, so that from this moment onwards if the rotation rate drops further the centrifugal weight 37 lifts itself away from the knife-edge bearing 39 and is supported on the knife-edge bearing 40. Due to this change of abutment now the compression spring 29 can increasingly use its force for friction generation. To the same extent that the compression spring 29 exerts a moment against the weakening centrifugal force upon the centrifugal weight 37, the region with the bolt 41 can be loaded, by the supporting on the knife-edge bearing 40, in the direction towards the friction face 46, in order to increase the friction force there. The mounting of the centrifugal weights in the knife-edge bearings involves a very low production expense. This style of mounting of the centrifugal weights is not bound to the arrangement in the hub disc of the torsion damper device 5. In principle the arrangement of the centrifugal weights can also take place in the first fly-wheel 1, according to the embodiments of FIGS. 1 to 4. It is to be noted that in using the device of FIG. 6 in an embodiment according to FIGS. 3 and 4 the friction device 10 bridges at low rotation rate only the torsion springs 6, whereas the movement of the cover plates 13, 14 with respect to the hub disc 12 remains unchanged by the friction device 10.

Figure 7:
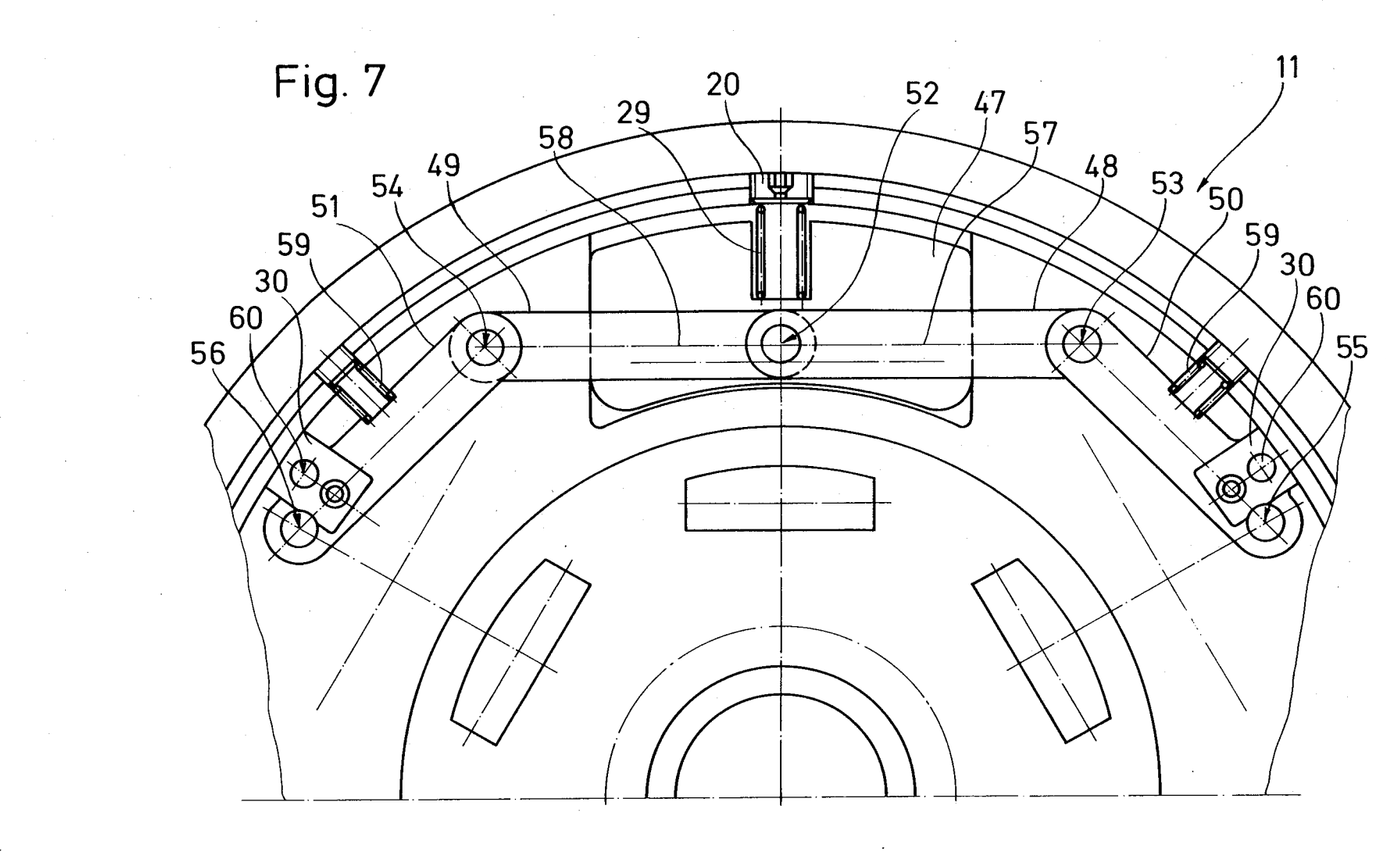
FIG. 7 shows the partial view of an arrangement with transmission of the centrifugal forces through toggle levers.

FIG. 7 shows the partial elevation of a friction device 11 which can be arranged either in a hub disc or in a fly-wheel. The friction device 11 as illustrated shows an arrangement of toggle levers which have an especially advantageous influence upon the nature of the friction onset in dependence upon the rotation rate. FIG. 7 shows the central arrangement of a centrifugal weight 47 in each case in combination with toggle levers 48, 49, 50 and 51. In the operation condition as illustrated, let it be assumed that the centrifugal weight 47 is brought by the compression spring 29 into its radially innermost position as a result of a rotation rate below the idling rate. Centrally in the centrifugal weight 47 a pivot point 52 is arranged on which there act two toggle levers 48 and 49 which extend approximately on a tangent and each of which extends in a different direction of rotation. In their end regions the toggle levers 48 and 49 each have a joint 53 and 54 respectively, with which they engage in further toggle levers 50 and 51 respectively. These toggle levers 50 and 51 separately extend again likewise approximately tangentially and are rotatably mounted fast in location in joints 55 and 56 at their ends opposite to the joints 53 and 54. This mounting takes place in the same component in which the mounting of the centrifugal weights 47 also takes place. Each of the toggle levers 50 and 51 is loaded in the region between the joints 53, 55 and 54, 56 by a return spring 59 in each case which springs support a pivoting of the levers radially inwards about the pivot points 55 and 56. In the region between the return springs 59 and the respective pivot points 55 and 56, each of the two toggle levers 50 and 51 comprises a friction angle piece 30 which is of a configuration and manner of operation in principle as already described in connection with FIGS. 3 and 4. The friction angle pieces 30 are mounted limitedly pivotably about pivot journals 60 in order to guarantee a satisfactory abutment during the frictional engagement.

The manner of operation of the friction device 11 is as follows: In the condition as illustrated, corresponding to a rotation rate below the idling rate, the centrifugal weights 47 are driven radially inwards by the compression springs 29. In this operational condition the line 57 of connection between the joint 53 and the pivot point 52 and the like 58 of connection between the joint 54 and the pivot point 52 form an appropriately straight line. Thus the reaction of the return springs 59 upon the centrifugal weight 47 is substantially precluded. Thus in the present operational condition the friction force on the friction angle pieces 30 is substantially dependent on the selection of the lever lengths. In this operational condition the friction angle pieces 30 lie against a correspoinding counter-face and here generate the high friction. With increasing rotation rate in the direction towards the idling rate the centrifugal weight 47 begins to move radially outwards against the force of the compression spring 29. This movement is also executed by the pivot point 52, so that the connection lines 57 and 58 gradually form an angle with one another and no longer extend in alignment. At the same time the two toggle levers 50 and 51 are pivoted radially inwards about the pivot points 55 and 56 respectively. This pivoting firstly initiates the bringing of the friction angle pieces 30 out of engagement and also, with increasing angle between the two connection lines 57 and 58, the return springs 59 can exert a component upon the centrifugal weight 47 which accelerates the radially outward movement of the centrifugal weight 47. Thus by this mechanism it is possible to engage and disengage the friction device completely within a very narrow rotation rate difference.

It is to be noted that in all embodiments the dependency of the friction devices on the rate of rotation can be selected so that a critical rotation rate below the idling rotation the friction devices are effective to damp the high vibration oscillations which may occur at such rates especially on starting and before stopping the engine. At the idling rate of the engine and beyond the idling rate towards larger rates of rotation the friction device is ineffective.

While specific embodiments of the invention have been shown and described in detail to illustrate the application of the inventive principles, it will be understood that the invention may be embodied otherwise without departing from such principles.

It is to be noted that the reference numbers in the claims are only provided in view of facilitating the understanding of the claims. These reference numbers are by no means to be understood as restrictive.

What is claimed is:

1. A fly-wheel unit having an axis and comprising a first fly-wheel connected with the crank-shaft of an internal combustion engine, a second fly-wheel which is mounted on the first fly-wheel for angular movement with respect thereto, and a torsion damper device for torque transmission between the first and the second fly-wheels respectively, said torsion damper device including torsion springs and a centrifugal force-controlled friction device being capable of bridging at least part of said torsion damper device, said centrifugal force-controlled friction device being effective below the idling rotation rate of the internal combustion engine and generating a high frictional torque, centrifugal masses being provided which are arranged displaceably and generate a friction force in relation to a rotatable part, the centrifugal masses being pivotally mounted by means of a pivot axis on the first fly-wheel, a compression spring acting onto the respective said centrifugal mass from radially outside at a distance from the pivot axis, a friction piece being provided on the centrifugal mass on the side of the pivot axis remote from the compression spring, the friction piece being made substantially L-shaped and being rotatably arranged with one somewhat radially inwardly pointing leg for pivoting through a pre-determined amount on the centrifugal mass, about a rotation axis parallel to the pivot axis of the centrifugal mass while the other axially protruding leg comprises a friction face for action upon a corresponding counter-piece, and the counter-piece is formed as an output part of the torsional damper device.

2. A fly-wheel unit having an axis and comprising a first fly-wheel adapted for connection with a crankshaft of an internal combustion engine, a second fly-wheel rotatably mounted with respect to said first fly-wheel about said axis and adapted for being connected with a clutch unit, and vibration damping torque transmission means between said first fly-wheel and said second fly-wheel, said torque transmission means including torsion spring means permitting angular deflection of said first fly-wheel and said second fly-wheel with respect to each other about said axis, and further including a friction device between said first fly-wheel and said second fly-wheel, said friction device being controlled by centrifugal mass means such that an increased frictional torque about said axis occurs between said first fly-wheel and said second fly-wheel in a rpm range below the idling rpm of the internal combustion engine, said centrifugal mass means comprising at least one centrifugal mass pivotally mounted on one of said fly-wheels about a pivot axis substantially parallel to said axis, said centrifugal mass comprising a first portion and a second portion both extending in substantially peripheral direction about said axis from said pivot axis, the center of mass of said centrifugal mass being located in the area of said first portion, a centrifugal biasing means acting on said first portion in a radially inward direction with respect to said axis, and said second portion carrying a friction piece engageable with a counterpiece provided on the other one of said fly-wheels, said friction piece approaching said counter-piece in radial outward direction in response to radial inward movement of said first portion under the action of said centrifugal mass biasing means.

3. A fly-wheel unit having an axis and comprising a first fly-wheel adapted for connectoin with a crankshaft of an internal combustion engine, a second fly-wheel rotatably mounted with respect to said first fly-wheel about said axis and adapted for being connected with a clutch unit, and vibration damping torque transmission means between said first fly-wheel and said second fly-wheel, said torque transmission means including torsion spring means permitting angular deflection of said first fly-wheel and said second fly-wheel with respect to each other about said axis, and further including a friction device between said first fly-wheel and said second fly-wheel, said friction device being controlled by centrifugal mass means such that an increased frictional torque about said axis occurs between said first fly-wheel and said second fly-wheel in a rpm range below the idling rpm of the internal combustion engine, said centrifugal mass means comprising at least one centrifugal mass pivotally mounted on one of said fly-wheels about a pivot axis substantially parallel to said axis, said centrifugal mass comprising a first portion and a second portion both extending in substantially peripheral direction about said axis from said pivot axis, the center of mass of said centrifugal mass being located in the area of said first portion, a centrifugal biasing means acting on said first portion in a radially inward direction with respect to said axis, and said second portion carrying a friction piece engageable with a counter-piece provided on the other one of said fly-wheels, said friction piece approaching said counter-piece in radial outward direction in response to radial inward movement of said first portion under the action of said centrifugal mass biasing means, said centrifugal mass being pivotally mounted on said first fly-wheel and said counter-piece being provided on said second fly-wheel, said torque-transmission means having a first torque transmission unit fastened in rotation with said first fly-wheel and a second torque transmission unit fastened in rotation with said second fly-wheel, said second torque transmission unit carrying said counter-piece.

4. A fly-wheel unit as set forth in claim 2 or 3, said friction device being controlled by said centrifugal mass means such as to provide decreasing frictional torque between said first fly-wheel and said second fly-wheel when the increasing rpm of the internal combustion engine approaches said idling rpm.

5. A fly-wheel unit as set forth in claim 2 or 3 said centrifugal mass means being biased by centrifugal mass-biasing means towards a position corresponding to increased frictional torque.

6. A fly-wheel unit as set forth in claim 5, the biasing action of said centrifugal mass-biasing means being adjustable by biasing action adjustment means.

7. A fly-wheel unit as set forth in claim 2 or 3, said friction device being located axially between said first fly-wheel and said second fly-wheel.

8. A fly-wheel unit as set forth in claim 2 or 3, said friction piece being rotatably mounted about a rotation axis on said centrifugal mass, rotation of said friction piece about said rotation axis with respect to said centrifugal mass being limited by abutment means.

9. A fly-wheel unit as set forth in claim 2 or 3, said centrifugal mass being accommodated within a cavity of said one fly-wheel, said cavity being open towards an axially opposite face of said other fly-wheel, said counter-piece being located axially between said centrifugal mass and said opposite face of said other fly-wheel.

10. A fly-wheel unit as set forth in claim 9, said torsion spring means comprising at least one torsional spring said torsional spring being accommodated in axially aligned windows of a central disc and of two cover plates respectively on both axial sides of said central disc, said cover plates being fastened for common rotation to said other fly-wheel and being located axially between said fly-wheels one of said cover plates being axially adjacent to said cavity, said counter-piece being mounted on said one cover plate, said central disc being in torque-transmitting connection with said one fly-wheel.

11. A fly-wheel unit as set forth in claim 10, said central disc being located axially between two further cover plates which are fastened for common rotation with said one fly-wheel, at least one further torsional spring being accommodated in further axially aligned windows of said central disc and said further cover plates respectively, said at least one further torsional spring being located radially inwards of said at least one torsional spring and said further side plates being located radially inwards of said side plates.

12. A fly-wheel unit as set forth in claim 2 or 3, said friction piece being L-shaped in cross-section and having a first substantially radially extending leg mounted on said centrifugal mass and a second substantially axially directed leg for engagement with said counter-piece.

13. A fly-wheel unit as set forth in claim 2, said centrifugal mass being pivotally mounted on said first fly-wheel and said counter-piece being provided on said second fly-wheel.

14. A fly-wheel unit as set forth in claim 13, said torque-transmission means having a first torque transmission unit fastened in rotation with said first fly-wheel and a second torque transmission unit fastened in rotation with said second fly-wheel, said second torque transmission unit carrying said counter-piece.

* * * * *